(12) United States Patent
Liu et al.

(10) Patent No.: US 8,639,034 B2
(45) Date of Patent: Jan. 28, 2014

(54) MULTIMEDIA INFORMATION RETRIEVAL SYSTEM WITH PROGRESSIVE FEATURE SELECTION AND SUBMISSION

(75) Inventors: Xu Liu, Cupertino, CA (US); Jamey Graham, San Jose, CA (US); Michael Simbirsky, Santa Clara, CA (US); Peter E. Hart, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 362 days.

(21) Appl. No.: 12/950,966

(22) Filed: Nov. 19, 2010

(65) Prior Publication Data

US 2012/0131088 A1    May 24, 2012

(51) Int. Cl.
 *G06K 9/46*    (2006.01)
 *G06K 9/62*    (2006.01)
 *G06K 9/54*    (2006.01)

(52) U.S. Cl.
 USPC .......................... 382/190; 382/225; 382/305

(58) Field of Classification Search
 None
 See application file for complete search history.

(56) References Cited

U.S. PATENT DOCUMENTS

| | | | |
|---|---|---|---|
| 5,854,858 A | 12/1998 | Girod et al. | |
| 6,259,820 B1 | 7/2001 | Stone | |
| 6,445,834 B1* | 9/2002 | Rising, III | 382/305 |
| 6,711,293 B1 | 3/2004 | Lowe | |
| 6,999,074 B2 | 2/2006 | Grzeszczuk et al. | |
| 2002/0051576 A1* | 5/2002 | Choi et al. | 382/218 |
| 2003/0026486 A1 | 2/2003 | Chu et al. | |
| 2004/0071368 A1* | 4/2004 | Chadha et al. | 382/305 |
| 2004/0264780 A1* | 12/2004 | Zhang et al. | 382/224 |
| 2005/0065929 A1* | 3/2005 | Rui | 707/5 |
| 2006/0251292 A1* | 11/2006 | Gokturk et al. | 382/103 |
| 2006/0253491 A1* | 11/2006 | Gokturk et al. | 707/104.1 |
| 2006/0262962 A1* | 11/2006 | Hull et al. | 382/103 |

(Continued)

FOREIGN PATENT DOCUMENTS

| | | |
|---|---|---|
| EP | 1852787 A1 * | 11/2007 |
| WO | 2007128452 | 11/2007 |

OTHER PUBLICATIONS

Gabriel Takacs, Vijay Chandrasekhar, Natasha Gelfand, Yingen Xiong, Wei-Chao Chen, Thanos Bismpigiannis, Radek Grzeszczuk, Kari Pulli, and Bernd Girod. 2008. Outdoors augmented reality on mobile phone using loxel-based visual feature organization. In Proceedings of the 1st ACM international conference on Multimedia information retrieval (MIR '08).*

(Continued)

*Primary Examiner* — Stephen R Koziol
*Assistant Examiner* — Jonathan S Lee
(74) *Attorney, Agent, or Firm* — Patent Law Works LLP

(57) ABSTRACT

A system and method for information retrieval comprises a computing device with a client and a progressive feature server coupled by a network. The client includes a feature extraction module, a progressive sending module, a sampling module and a feedback receiver. The progressive sending module divides the features into groups and sends them to the server. The progressive sending module is also responsive to commands from the feedback receiver to terminate the transmission of additional features if a match is found. The progressive feature server is coupled for communication with the client and includes a progressive receiving module, a feedback generator, an image recognizer and a result delivery module. The image recognizer progressively processes the groups of extracted features received from the client and provides results and hints for improved recognition. The present invention also includes methods for processing captured information progressively, sending extracted features in groups, and progressively performing image recognition for improved recognition speed.

20 Claims, 10 Drawing Sheets

(56) References Cited

U.S. PATENT DOCUMENTS

| | | | | |
|---|---|---|---|---|
| 2006/0285172 | A1* | 12/2006 | Hull et al. | 358/448 |
| 2007/0041667 | A1* | 2/2007 | Cox | 382/305 |
| 2007/0046982 | A1* | 3/2007 | Hull et al. | 358/1.15 |
| 2007/0046983 | A1* | 3/2007 | Hull et al. | 358/1.15 |
| 2007/0047782 | A1* | 3/2007 | Hull et al. | 382/124 |
| 2008/0071749 | A1 | 3/2008 | Schloter | |
| 2008/0310725 | A1* | 12/2008 | Kurata et al. | 382/190 |
| 2009/0015676 | A1* | 1/2009 | Ke et al. | 348/169 |
| 2009/0016604 | A1* | 1/2009 | Ke et al. | 382/176 |
| 2009/0019402 | A1* | 1/2009 | Ke et al. | 715/849 |
| 2009/0076996 | A1* | 3/2009 | Hull et al. | 706/46 |
| 2009/0083235 | A1 | 3/2009 | Joao | |
| 2009/0083237 | A1 | 3/2009 | Gelfand et al. | |
| 2009/0100050 | A1* | 4/2009 | Erol et al. | 707/5 |
| 2009/0100334 | A1* | 4/2009 | Hull et al. | 715/255 |
| 2009/0110293 | A1* | 4/2009 | Iwasaki | 382/209 |
| 2009/0125510 | A1* | 5/2009 | Graham et al. | 707/5 |
| 2009/0238460 | A1 | 9/2009 | Funayama et al. | |
| 2010/0226575 | A1 | 9/2010 | Grzeszczuk et al. | |

OTHER PUBLICATIONS

Xu Liu and David Doermann. 2008. Mobile Retriever: access to digital documents from their physical source. Int. J. Doc. Anal. Recognit. 11, 1 (Sep. 2008), 19-27. DOI=10.1007/s10032-008-0066-4 http://dx.doi.org/10.1007/s10032-008-0066-4.*

Yinghua Zhou; Xin Fan; Xing Xie; Yuchang Gong; Wei-Ying Ma; , "Inquiring of the Sights from the Web via Camera Mobiles," Multimedia and Expo, 2006 IEEE International Conference on , vol., No., pp. 661-664, Jul. 9-12, 2006 doi: 10.1109/ICME.2006.262532 keywords: {Asia;Books;Cameras;Flowcharts;Image databases;Image matching;Large-scale systems;Spatial.*

Castelli, V., Bergman, L.D., Kontoyiannis, I., Li, C.-S., Robinson, J.T., and Turek, J.J., Progressive search and retrieval in large image archives, 1998, IBM Journal of Research and Development, vol. 42, No. 2, pp. 253-268.*

Chandrasekhar, V., Tsai, S.S., Takacs, G., Chen, D.M., Cheung, N., Vedantham, R., Reznik, Y., Grzeszczuk, R., and Girod, B., Low Latency Image Retrieval with Progressive Transmission of CHoG Descriptors, 2010, MCMC '10, pp. 41-46.*

V. Chandrasekhar et al., "Quantization Schemes for Low Bitrate Compressed Histogram of Gradients Descriptors", IEEE International Workshop on Mobile Vision (in conjunction with CCPR 20010), California, Jun. 2010.

Lowe, "Distinctive Image Features From Scale-Invariant Keypoints", International Journal of Computer Vision, 60, 2. pp. 91-110, 2004.

Bay et al., "SURF: Speeded UP Robust Features", Computer Vision and Image Understanding (CVIU), vol. 110, No. 3, pp. 346-359, 2008.

Ozuysal et al., "Fast Keypoint Recognition in Ten Lines of Code," 2007 Computer Vision Laboratory, IEEE Conference on Comuting Vision and Pattern Recognition.

Morel et al., "ASIFT: A New Framework For Fully Affine Invariant Image Comparison", Apr. 2009, SIAM Journal on Imaging Sciences Comparison, Sci. 2, 2, pp. 438-469.

* cited by examiner

MULTIMEDIA INFORMATION RETRIEVAL SYSTEM WITH PROGRESSIVE FEATURE SELECTION AND SUBMISSION

BACKGROUND OF THE INVENTION

1. Field of the Invention

The present invention relates to information retrieval systems, and in particular, to a system and method of information retrieval that utilize progressive feature selection and submission. Still more particularly, the present invention relates to a visual search system and method that uses progressive feature selection and submission.

2. Description of the Background Art

The use of portable computing devices has become commonplace for millions of users. In addition to having a conventional desktop computer, many users also have some type of portable computing device. Smaller portable computing devices include a plethora of smart phones including the iPhone from Apple Inc., the Blackberry from Research In Motion and the Pre from Palm just to name a few. There have also been increased sales of notebook laptops and tablet computers offering different levels of processing capability and size.

These new devices are now often used for visual search. Visual search technology links the physical world to the digital world by matching the visual appearance of objects against a database. The most popular visual search architecture 100 as of today is client-server, as shown in FIG. 1: the client (typically a camera or smart phone 204) acquires an image 106 of a document 102, submits that image 106 to a server 108, the server 108 runs image matching algorithm (usually involves feature extraction, candidate selection and geometrical verification) and then return the closest match to the client 204.

The problem with this architecture 100 is network latency. When the user submits an image to the server 108 it may take 5~10 seconds to finish the upload depending on the network. It is especially power consuming and slow to maintain an upstream connection over the phone network. While waiting for the upload to finish the user often loses patience and blames the program as not working. This is even worse if the search query results do not match, which is often the case because the submitted image is blurry, dark or empty.

There have been attempts in the prior art to solve the above issues, but they have not been successful. For example, some have attempted to solve the latency problem with a new architecture that moves the feature extraction step to the client side. Instead of the server, the phone runs feature extraction and submits the extracted feature vectors to the server. However, some of the client side devices such a smart phone have limited computational capabilities so latency continues to be an issue. Furthermore, this architecture accelerates the submission only by the difference between the size of the feature vectors and the image itself, which in many cases is not enough to eliminate the problems of network latency.

SUMMARY OF THE INVENTION

Embodiments of the present invention overcome the deficiencies and limitations of the prior art by providing a system and method of information retrieval that utilize progressive feature selection and submission. The system provides a new visual search architecture in which feature extraction is performed on the client device, and instead of submitting image to the server, the extracted feature vectors are submitted progressively. The server starts feature matching before receiving the full feature set. Feature transmission is interrupted when a success matching is found and therefore saves time. The new architecture enables close-to real-time visual search and it is independent to the feature used for visual search.

One embodiment of the system comprises a computing device with a client and a progressive feature server coupled by a network. The client of computing device includes a feature extraction module, a progressive sending module, a sampling module and a feedback receiver. The feature extraction module extracts features from the image and provides them to the progressive sending module. The progressive sending module divides the features into groups and sends them to the server. The progressive sending module is also responsive to commands from the feedback receiver. The feedback receiver is coupled to the progressive feature server and interrupts the progressive sending module to terminate the transmission of additional features if a match is found. In one embodiment, the sampling module is used to sample input received by the computing device prior to feature extraction. The progressive feature server is coupled for communication with the client and includes a progressive receiving module, a feedback generator, an image recognizer and a result delivery module. The progressive receiving module receives extracted features from the client and provides them to the image recognizer. The image recognizer progressively processes the groups of extracted features received from the client and provides results and hints for improved recognition. The feedback generator sends the hints back to the client and the result delivery module sends the results back to the client.

The present invention also includes novel methods for processing captured information progressively, assigning extracted features to groups for uploading, and progressively performing image recognition to improve recognition speed.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
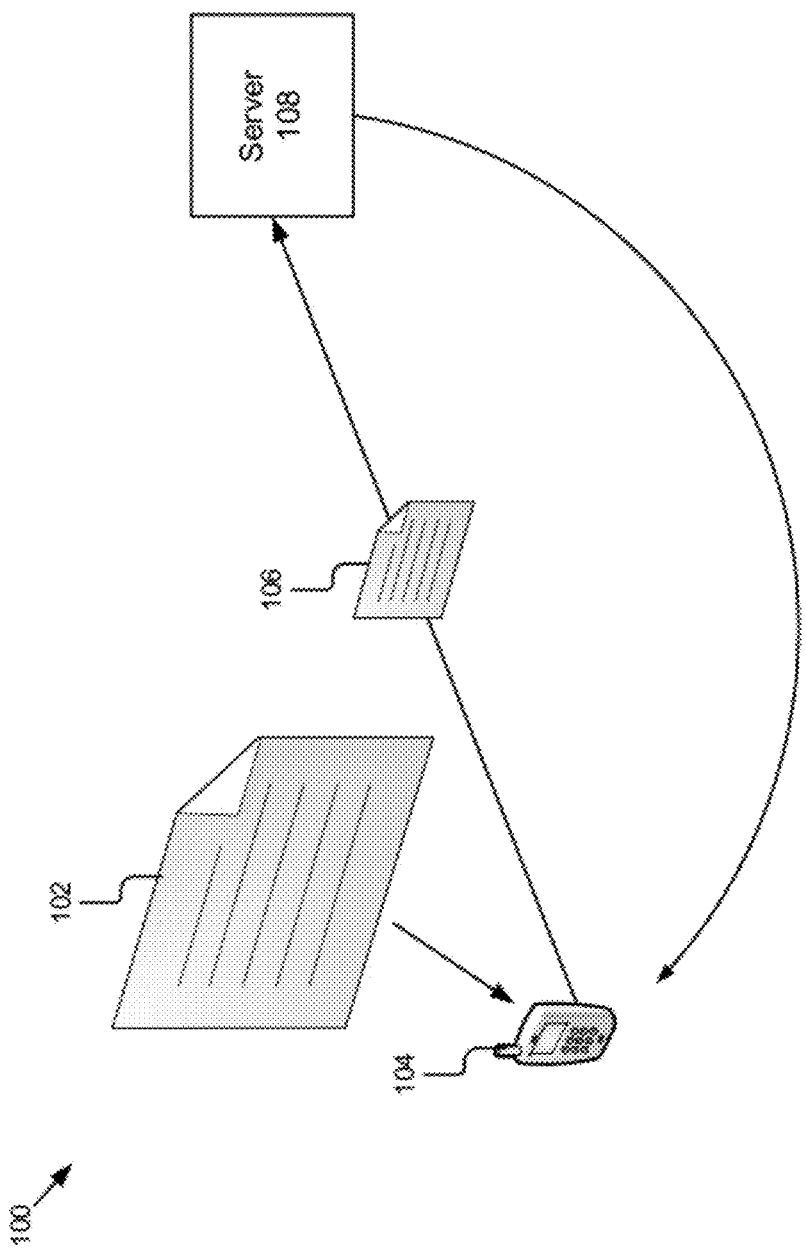
FIG. 1 is a block diagram of a prior art visual search system

A system and method for information retrieval that utilize progressive feature selection and submission are described below. In the following description, for purposes of explanation, numerous specific details are set forth in order to provide a thorough understanding of the invention. For example, the present invention will largely be described below in the context visual search. It will be apparent, however, to one skilled in the art that the invention can be practiced without these specific details. In other instances, structures and devices are shown in block diagram form in order to avoid obscuring the invention. However, the present invention applies to any type of portable computing device that can capture different type of events electronically.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic optical disks, read-only memories (ROMs), random access memories (RAMs), EPROMs, EEPROMs, magnetic or optical cards, or any type of media suitable for storing electronic instructions, each coupled to a computer system bus.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a flash memory, a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is described with reference to a particular programming language. It will be appreciated that a variety of programming languages may be used to implement the teachings of the invention as described herein.

System Overview

Figure 2:
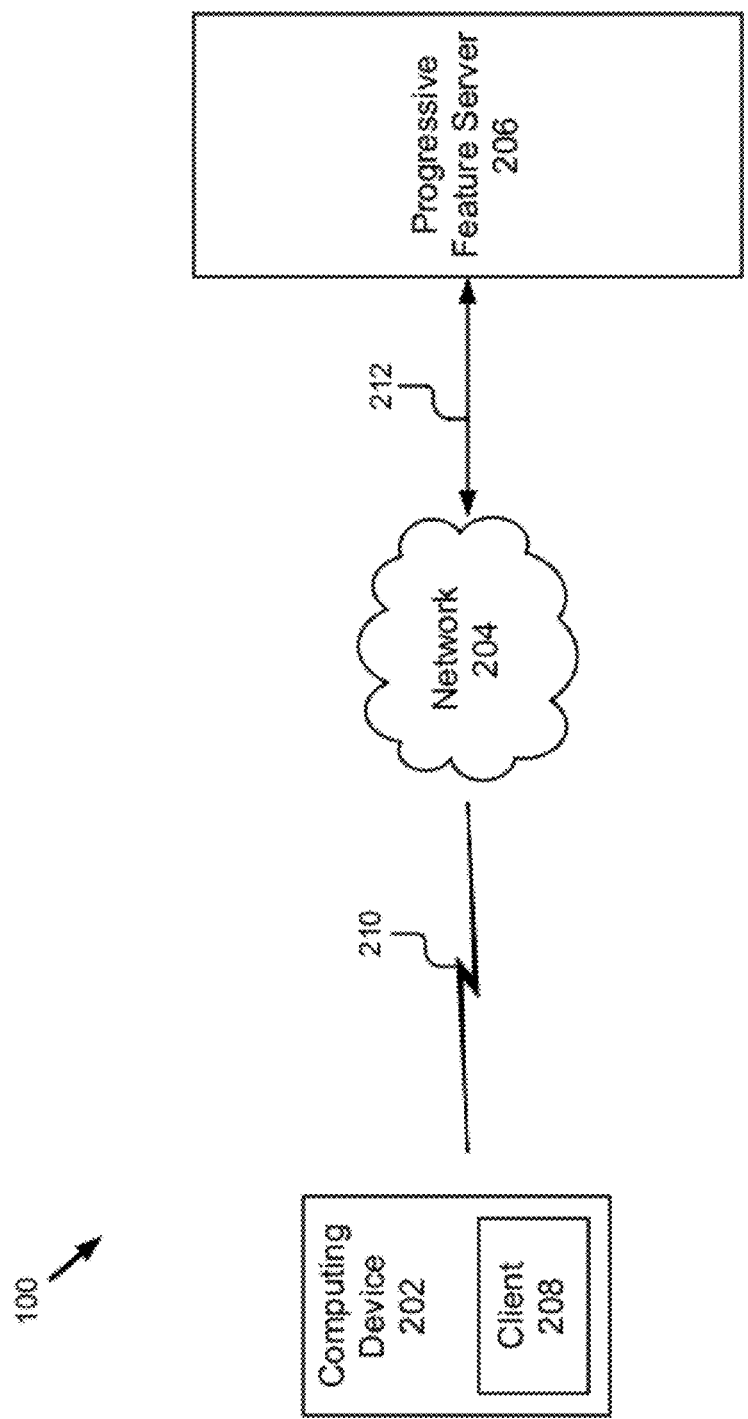
FIG. 2 is a block diagram of an embodiment of a system for information retrieval that utilizes progressive feature selection and submission in accordance with the present invention.

FIG. 2 shows an embodiment of a system 100 for information retrieval that utilizes progressive feature selection and submission. In one embodiment, the system 100 includes a computing device 202 having a client 208, a network 204 and a progressive feature server 206. The computing device 202 is coupled to the network 204 by signal line 210. Although shown in FIG. 2 as a wireless connection 210, those skilled in the art will recognize that the computing device 202 could just as easily be coupled to the network 204 by a wired connection. The network 204 is also coupled by signal line 212 to the progressive feature server 206. Although only a single computing device 202 is shown in FIG. 2, those skilled in the art will recognize that there could be a plurality of computing devices 202 cooperating and communicating with the progressive feature server 206.

In one embodiment of the present invention, this new visual search architecture 100 speeds up visual search by 30% on top of the state of the art (result obtained with Invisible Junction features and DMV driver manual database). In one embodiment of the present invention, feature extraction is performed on the client device 208, and instead of submitting an entire image to the progressive feature server 206, the extracted feature vectors are submitted progressively. The progressive feature server 206 starts feature matching before receiving the full feature set. Feature transmission from the client 208 is interrupted when a success matching is found and therefore saves time. The present invention enables close to real-time visual search and it is independent to the features used for visual search. The worst case speed of the present invention is equivalent to today's most care and advanced architecture.

The computing device 202 is a conventional type but also includes the novel client 208 of the present invention. The computing device 202 accesses and communicates with the progressive feature server 206 to initially input features for recognition and receive results. In one embodiment, the computing device 202 is a conventional desktop personal computer. In another embodiment, the computing device 202 is a portable computing device with display, input and wireless communication capability. For example, the portable computing device could be a smart phone or mobile phone. In yet embodiment, the computing device 202 is a laptop computer, notebook computer or tablet computer. One embodiment of the computing device 202 and client 208 will be described in more detail below with reference to FIG. 3.

The network 204 is a conventional type, wired or wireless, and may have any number of configurations such as a star configuration, token ring configuration or other configurations known to those skilled in the art. Furthermore, the network 204 may comprise a local area network (LAN), a wide area network (WAN) (e.g., the Internet), and/or any other interconnected data path across which multiple devices may communicate. In yet another embodiment, the network 204 may be a peer-to-peer network. The network 204 may also be coupled to or includes portions of a telecommunications network for sending data in a variety of different communication protocols. In yet another embodiment, the network 204 includes Bluetooth communication networks or a cellular communications network for sending and receiving data such as via short messaging service (SMS), multimedia messaging service (MMS), hypertext transfer protocol (HTTP), direct data connection, WAP, email, etc.

The progressive feature server 206 is coupled to the network 204 via signal line 212 for communication with the computing device 202. The progressive feature server 206 includes progressive receiving module 414, a feedback generator 416, an image recognizer 418 and a result delivery module 420 (See FIG. 4). The progressive feature server 206 sends and receives information to and from the computing devices 202, performs image recognition, and provides recognition hints. This is particularly advantageous because the progressive feature server 206 performs these operations on a progressive manner thereby reducing recognition time, reducing data transmission over the network and reducing computation on the client 208.

Although the system of FIG. 2 shows only one progressive feature server 206, it should be understood that there could be any number of additional progressive feature servers 206, for example dedicated to other functions, companies, institutions, organizational structures. A computing device 202 may communicate with more than one progressive feature server 206. Particular features or other information could be associated with different progressive feature servers 206

Computing Device 202

Figure 3:
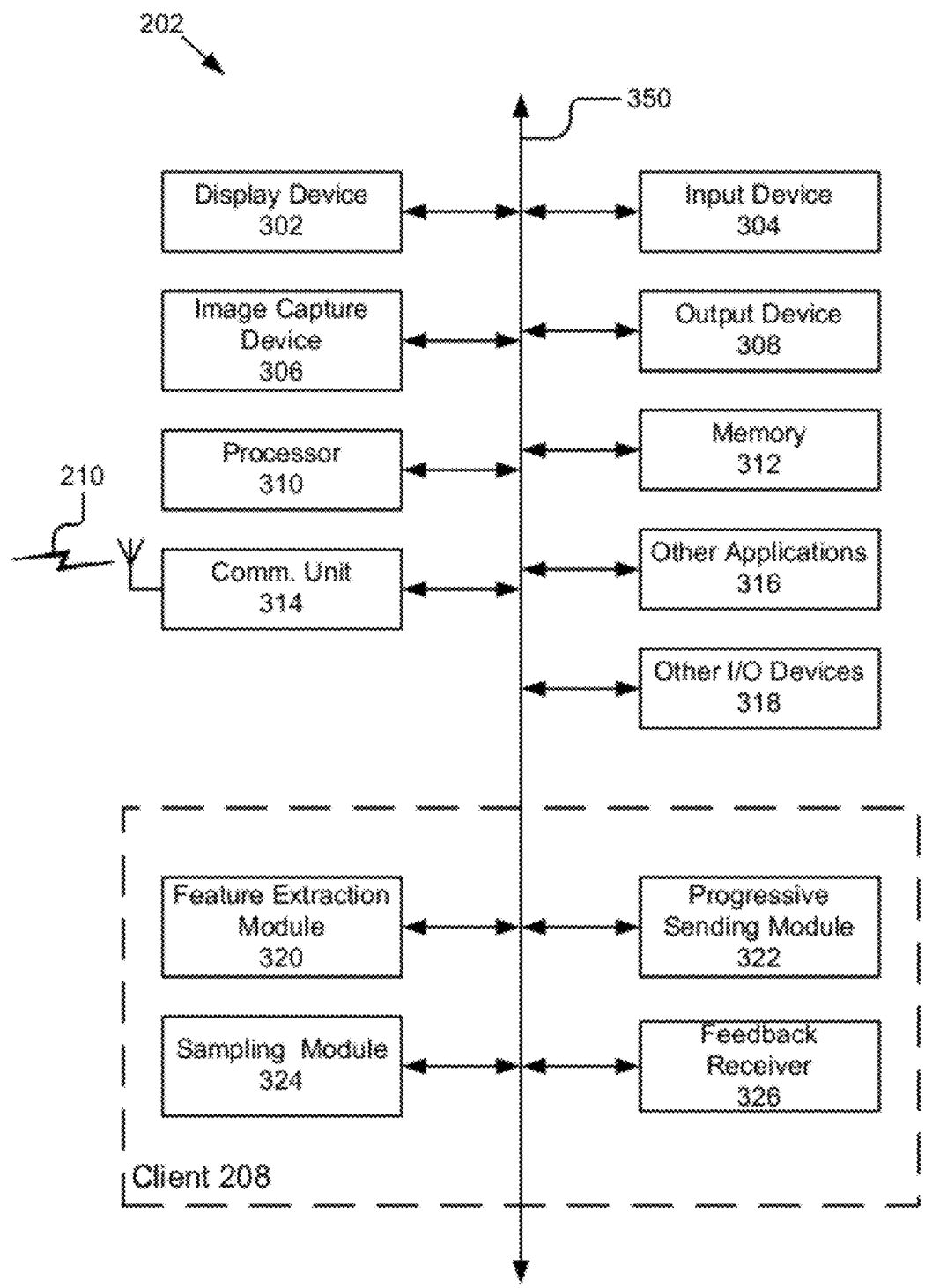
FIG. 3 is a block diagram of an embodiment of the computing device in accordance with the present invention.

Referring now to FIG. 3, an embodiment of the computing device 202 will be described in more detail. The computing device 202 comprises a display device 302, an input device 304, an image capture device 306, an output device 308, a processor 310, a memory 312, a communication unit 314, other applications 316, other input/output (I/O) devices 318, a bus 350 and a client 208.

The display device 302 is a liquid crystal display (LCD) or any other similarly equipped display device, screen or monitor. The display device 302 represents any device equipped to display electronic images and data as described herein. In another embodiment, the display device 302 is an electronic paper display or a conventional display such as a CRT. In different embodiments, the display is binary (only two different values for pixels), monochrome (multiple shades of one color) or allows multiple colors and shades.

The input device 304 includes a keyboard and mouse type controller. Those skilled in the art will recognize that the input device 304 can include a stylus or similar pointing device. The input device 304 can also include a plurality of input devices or buttons for specific commands.

The image capture device 306 is a digital camera. For example, the image capture device 306 is a web camera either stand-alone or integrated into a laptop computer. In other embodiments, the image capture device 306 is a conventional type camera such as those available on cell phones or notebook computers.

The output device 308 is one or more LEDs, speakers or other types of conventional output devices. The output device 308 includes other types of smaller displays. For example, the output device 308 is used to indicate the status of the device. Those skilled in the art will recognize that there may be a variety of additional status indicators that may be part of the output device 308.

The processor 310 comprises an arithmetic logic unit, a microprocessor, a general purpose controller or some other processor array to perform computations, provide electronic display signals to display device 302. The processor 310 is coupled to the bus 350 for communication with the other components of the computing device 202. Processor 310 processes data signals and may comprise various computing architectures including a complex instruction set computer (CISC) architecture, a reduced instruction set computer (RISC) architecture, or an architecture implementing a combination of instruction sets. Although only a single processor is shown in FIG. 3, multiple processors may be included. The processing capability of the computing device 202 may be limited to supporting the display of images and the capture and transmission of image. The processing capability might be enough to perform more complex tasks, including various types of feature extraction and sampling. It will be obvious to one skilled in the art that other processors, operating systems, sensors, displays and physical configurations are possible. The computing device 202 also includes an operating system executable by the processor such as but not limited to WINDOWS®, Mac OS X, Android, or UNIX® based operating systems.

The memory 312 stores instructions and/or data that may be executed by processor 310. The memory 312 is coupled by the bus 350 for communication with the other components of the computing device 202. The instructions and/or data may comprise code for performing any and/or all of the techniques described herein. The memory 312 may be a dynamic random access memory (DRAM) device, a static random access memory (SRAM) device, flash memory or some other memory device known in the art. In one embodiment, the memory 312 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 314 is coupled to an antenna and the bus 350. An alternate embodiment, the communication unit 314 may provide a port for direct physical connection to the network 204. The communication unit 314 includes a transceiver for sending and receiving images and data. In one embodiment, the communication unit 314 includes a Wi-Fi transceiver for wireless communication with an access point. In another embodiment, the communication unit 314 includes a Bluetooth® transceiver for wireless communication with other devices. In yet another embodiment, the communication unit 314 includes a cellular communications transceiver for sending and receiving data over a cellular communications network such as via short messaging service (SMS), multimedia messaging service (MMS), hypertext transfer protocol (HTTP), direct data connection, WAP, email, etc. In still another embodiment, the communication unit 314 includes ports for wired connectivity such as but not limited to USB, SD, or CAT-5, etc. The communication unit 314 links the processor 310 to the network 204 that may include multiple processing systems. The network of processing systems may comprise a local area network (LAN), a wide area network (WAN) (e.g., the Internet), and/or any other interconnected data path across which multiple devices may communicate. The communication unit 314 also provides other conventional connections to the network 204 for distribution of files (media objects) using standard network protocols such as TCP/IP, HTTP, HTTPS and SMTP as will be understood to those skilled in the art.

The other applications 316 include other software and routines executable by the processor 310 for various other types of functionality. In one embodiment, one or more application programs are executed by the processor 310 including, without limitation, word processing applications, electronic mail applications, financial applications, and web browser applications.

The other input/output (I/O) devices 318 may include speakers to produce sound, microphones to record sound, a scanner or camera to record documents or images, and other sensors or feedback devices like accelerometers, pager motors, or haptic feedback. Optionally, the other I/O devices 326 may include one or more analog-to-digital or digital-to-analog converters, and/or one or more digital signal processors to facilitate audio processing. In another embodiment, the input/output (I/O) devices 318 include a digitizing tablet or graphics pad, a touch screen, location sensors, light sensors, pressure sensor, clock, time sensor, microphone, a GPS system and speakers or other conventional input and output devices. In yet another embodiment, the other input/output (I/O) devices 318 include a plurality of more complex sensors that return an indication of pressure, location, time, etc. Those skilled in the art will recognize that the computing device 202 may include various combinations of input/output (I/O) devices from none to all of the ones listed above. These other I/O devices 318 are coupled by bus 350 for communication with the processor 310 and the memory 312. Optionally, a microcontroller may be added as part of other I/O devices 318 to facilitate power systems control, as well as off-load the main processor 310 from lower-speed lesser-important tasks.

The bus 350 represents a shared bus for communicating information and data throughout the computing device 202. The bus 350 may represent one or more buses including an industry standard architecture (ISA) bus, a peripheral component interconnect (PCI) bus, a universal serial bus (USB), or some other bus known in the art to provide similar functionality. Additional components coupled to processor 310 and each other through system bus 350 include the display device 302, the input device 304, the image capture device 306, the output device 308, the processor 310, the memory 312, then communication unit 314, the other applications 316, the other input/output (I/O) devices 318, the client 208, the feature extraction module 320, the progressive sending module 322, the sampling module 324 and the feedback receiver 326. There may also be a plurality of buses in computing device 202, designed to provide the most efficient communications between functional elements.

Client 208

As shown in FIG. 2, the client 208 further comprises a feature extraction module 320, a progressive sending module 322, a sampling module 324 and a feedback receiver 326. These components are coupled for communication with each other and to the progressive feature server 206 by the bus 350.

The feature extraction module 320 is software including routines for extracting features from an input signal. In one embodiment, the feature extraction module 320 is a set of instructions executable by the processor 310 to provide the functionality described below for extracting a set of features from an input signal. In another embodiment, the feature extraction module 320 is stored in the memory 312 of the computing device 202 and is accessible and executable by the processor 310. In either embodiment, the feature extraction module 320 is adapted for cooperation and communication with the processor 310 and other components of the computing device 202. The feature extraction module 320 extracts features from an image such as, but not limited to, scale invariant features (SIFT), invisible junction features, compressed histogram of gradients (CHoG) features, speeded up robust features (SURF), fast key point recognition (FERN) features and a fully affine scale invariant (ASIFT) features. The feature extraction module 320 is coupled to the image capture device 306 to receive images and extract features from the images. In other embodiments, the feature extraction module 320 is coupled to receive signals from the other input devices 304, 318 and generates features. For example, if the other I/O devices 318 include a microphone, the feature extraction module 320 receives the audio signal and extracts features for audio search and recognition. The feature extraction module 320 is also coupled to the progressive sending module 322 to provide the extracted features. In one embodiment, the feature extraction module 320 is coupled by the sampling module 324 to the source input signal (e.g., the image capture device 306, an input device 304, or other I/O devices 318). In an alternate embodiment, the feature extraction module 320 can also include a grouping module for sorting and grouping the extracted features according to scale, time, size or other attribute.

The progressive sending module 322 is software including routines for grouping features into packages or groups, and progressively and serially sending the packages or groups to the progressive feature server 206. In one embodiment, the progressive sending module 322 is a set of instructions executable by the processor 310 to provide the functionality described below for progressively sending the groups of features. In another embodiment, the progressive sending module 322 is stored in the memory 312 of the computing device 202 and is accessible and executable by the processor 310. In either embodiment, the progressive sending module 322 is adapted for cooperation and communication with the processor 310 and other components of the computing device 202.

The progressive sending module 322 is coupled to the feature extraction module 320 to receive features that have been extracted from an input signal. The progressive sending module 322 groups the features into packages or groups and then transmits the packages or groups to the progressive feature server 206. In a first embodiment, the features are selected and ordered according to one or more of: 1) random selection, 2) reading order, 3) sparse selection, 4) feature scale, 5) feature space density, 6) geometric location, 7) time of capture, etc. Those skilled in the art will recognize that these groupings are merely listed by way of example, and that a variety of other types of groupings or packaging are anticipated. In a second embodiment, the progressive sending module 322 does not begin grouping or packaging until all the features have been extracted from a given image. In a third embodiment, the progressive sending module 322 requires a predefined number of features to form a group or package, and once that predefined number of features has been provided from the feature extraction module 320 (even though not all the features from a given image have been extracted), the progressive sending module 322 creates and sends the package to the progressive feature server 206. In another embodiment, the progressive sending module 322 includes grouping module to perform the extracted features. Those skilled in the art will recognize that the grouping module can be independent of the progressive sending module 322, part of the progressive sending module 322 or part of the feature extraction module 320. In yet another embodiment, the progressive sending module 322 is responsive to instructions received from the feedback receiver 326. In response to signals from the feedback receiver 326, the progressive sending module 322 either stops transmitting groups or packages to the progressive feature server 206, or includes different or unique features into the groups or packages before sending them to the progressive feature server 206. The progressive sending module 322 is coupled to the feature extraction module 320 to receive features, coupled to the feedback receiver 326 to receive feedback from the progressive feature server 206, and coupled to the communication unit 314 to send groups or packages to the progressive feature server 206, in particular the progressive receiving module 414.

The progressive sending module 322 is particularly advantageous because it selects and orders the grouping or packaging of features. The features are uploaded in sequential groups or batches by the progressive sending module 322. The progressive sending module 322 decides which features to submit first and which features to submit last. In one embodiment, the progressive sending module 322 truncates the image linearly, i.e. the features are sorted with Y coordinate and then X coordinate. In another embodiment, the progressive sending module 322 performs sparse sampling. For N batches of sparse sampling, every N−1 feature points are skipped. For example, pick the N-th, 2N-th, 3N-th . . . features for the first batch, (N−1)-th, (2N−1)-th, (3N−1)-th for the second batch . . . and so on. Sparse sampling picks the features from all over the image and evenly distributes the selections across the whole image. This produces approximately 30% acceleration comparing to submitting the full feature set. Sparse sampling performs slightly better since fewer overlapping features are submitted and features are always selected globally from the image. The progressive sending module 322 also orders the features according to the feature space. For example, the features may be sorted by scale (Most features have the scale property e.g. Invisible Junctions, SIFT, SURF . . . ), large scale features are usually more stable and captures the "big picture" of an image patch and therefore should be transmitted earlier than small scale features. For example, the progressive sending module 322 can sort SIFT features by scale and send large scale features first.

It should be understood that in one embodiment, the progressive sending module 322 has a communication channel with the progressive feature server 206 in one socket, independent from communication by the feedback receiver 326 with the progressive feature server 206 on a separate socket. In other words, there is asynchronous communication between the client 208 and the progressive feature server 206 such that the submission of features and waiting for a response occurs in parallel with possible terminations of submissions.

The progressive sending module 322 is particularly advantageous in a number of respects. First, the progressive sending module 322 rearranges feature vectors for submission. It does not take all the feature vectors from an image for a successful visual search. In some cases, 70% of the features are not required. Further, the progressive sending module 322 identifies the unique and stable features to enable early and more accurate matching. All features are not equal. Some features are more unique and stable than others. It should be understood that the progressive sending module 322 rearranges the feature vectors for submission, and that the feature vectors are not necessarily sent in the order in which they are extracted. Second, the progressive sending module 322 does not send all the image features at once, but rather sends the image features serially and progressively as a series of packages or groups. In some embodiments, this may reduce the overall server load when early recognition with less features occurs. Third, the progressive sending module 322 is responsive to signals from the progressive feature server 206 and terminates transmission of features when a match has occurred. In addition or alternatively, the progressive sending module 322 is responsive to hints or suggestions as to which features are more likely to result in early recognition, and in response to hints from the progressive feature server 206 regroups or creates packages containing those features and sends them to the progressive feature server 206 earlier, in some cases soon as possible. This is advantageous because it saves transmission time and bandwidth, and reduces response time. In some cases, this enables real-time visual search and a better user experience.

The sampling module 324 is software including routines for sampling the input signal received from the image capture device 306, the input device 304 or the other I/O device 318. In one embodiment, the sampling module 324 is a set of instructions executable by the processor 310 to provide the functionality described below sampling the input signal. In another embodiment, the sampling module 324 is stored in the memory 312 of the computing device 202 and is accessible and executable by the processor 310. In either embodiment, the sampling module 324 is adapted for cooperation and communication with the processor 310, the image capture device 306, the input device 304, the other I/O device 318, the feature extraction module 320 and other components of the computing device 202. The sampling module 324 samples the input signal and thereby reduces the amount of data provided to the feature extraction module 320. For example, in the case where the image capture device 306 is capturing video, the sampling module 324 selects particular frames of the captured video and provides those image frames to the feature extraction module 322 to perform recognition and search. Similarly, the sampling module 324 samples an audio input signal to reduce the amount of data that must be processed by the feature extraction module 320. The sampling module 324 is particularly advantageous because it allows the present invention to more quickly and accurately recognize images.

The feedback receiver 326 is software including routines for communicating with the progressive feature server 206 and controlling the operation of the progressive sending module 322. In one embodiment, the feedback receiver 326 is a set of instructions executable by the processor 310 to provide the functionality described below for controlling the operation of the progressive sending module 322. In another embodiment, the feedback receiver 326 is stored in the memory 312 of the computing device 202 and is accessible and executable by the processor 310. In either embodiment, the feedback receiver 326 is adapted for cooperation and communication with the processor 310, the progressive sending module 322, the communication unit 314 and other components of the computing device 202. The feedback receiver 326 is coupled for communication with the progressive feature server 206, in particular the feedback generator 416 and the result delivery module 420. The feedback receiver 326 is also coupled to the processor 310 to deliver the results of image recognition. The feedback receiver 326 is particularly advantageous because it provides control signals to the progressive sending module 322 to terminate the transmission of additional features or to request different or specific features be sent by the progressive sending module 322 in response to signals from the feedback generator 416 or the request delivery module 420 respectively.

Progressive Feature Server 206

Figure 4:
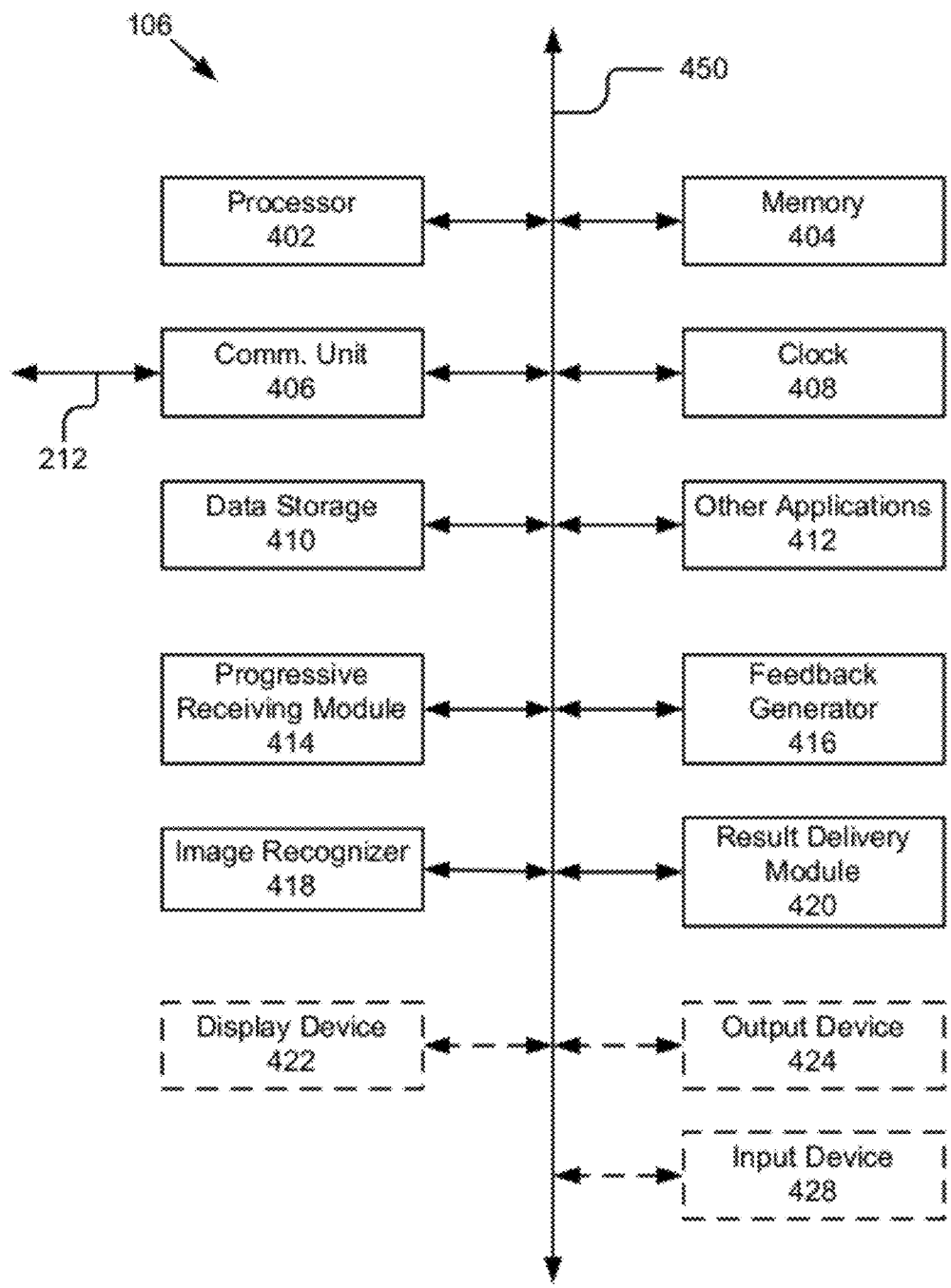
FIG. 4 is a block diagram of an embodiment of a progressive feature server in accordance with the present invention.

Referring now to FIG. 4, an embodiment of progressive feature server 206 will be described in more detail. The progressive feature server 206 comprises a processor 402, a memory 404, a communication unit 406, a clock 408, data storage 410, other applications 412, a progressive receiving module 414, a feedback generator 416, an image recognizer 418 and a result delivery module 420 and a bus 450. In an alternate embodiment, the progressive feature server 206 further comprises a display device 422, an output device 424, and an input device 428.

Those skilled in the art will recognize that some of the components of the progressive feature server 206 have the same or similar functionality to the components of the computing device 202 so descriptions of these components will not be repeated here. For an example, the processor 402, the memory 404, the communication unit 406, the other applications 412, the display device 422, the output device 424, the bus 450 and the input device 428 have the same or similar functionality to the processor 310, the memory 312, the communication unit 314, the other applications 316, the display device 302, the output device 308, bus 350 and the input device 304, respectively. Some differences between the components of the progressive feature server 206 and the computing device 202 are noted below. For example, the communication unit 406 couples the progressive feature server 206 to the network 204 in a wired manner via signal line 212 instead of wirelessly. The processor 402 is more computationally powerful than the processor 310 as the progressive feature server 206 likely services numerous computing devices 202. The display device 422 may be a CRT, and the output device 424 is speakers. The input device 428 includes a keyboard and mouse type controller. Those skilled in the art will recognize that there may be a variety of other differences as the components of the progressive feature server 206 acts as a hardware server as opposed to a remote client.

The clock 408 and the data storage 410 are conventional types understood by those skilled in the art. The data storage 410 includes a database of information against which the features can be compared. In one embodiment, the data storage 410 includes a database of information, images and corresponding features. In another embodiment, the data storage 410 includes a database of information audio and corresponding features. In yet another embodiment, the data storage 410 includes multimedia information, geographical information, or any other type of information associated with the visual search results. For example, if an image of sports column on one game is submitted, the URL to that game on YouTube or webcast or stream of that game is stored in the database 410 and returned to the client 208. Those skilled in the art will recognize that various type of information related to the visual search results can be stored in the database 410.

The progressive receiving module 414 is software and routines for receiving one of more groups of features from the client 208, in particular the progressive sending module 322. In one embodiment, the progressive receiving module 414 is routines executable by the processor 402 to perform the processing of features as described below. The progressive receiving module 414 is coupled by the bus 450 to the processor 402, the memory 404, the communication unit 406, and the image recognizer 418. The progressive receiving module 414 receives groups or packages of features from the progressive sending module 322. Once a complete group or package of features has been received from the progressive sending module 322 via the communication unit 406, the progressive receiving module 414 provides the group of features to the image recognizer 418 to begin recognition. In one embodiment, the progressive receiving module 414 also stores the group or package of features in the memory 404 (e.g., a buffer) for later use as additional packages are received from the sending module 322. In such an embodiment, as an additional package is received from the sending module 322, the progressive receiving module combines the additional package with other package(s) and then provides the plurality of packages to the image recognizer 418.

Figure 10:
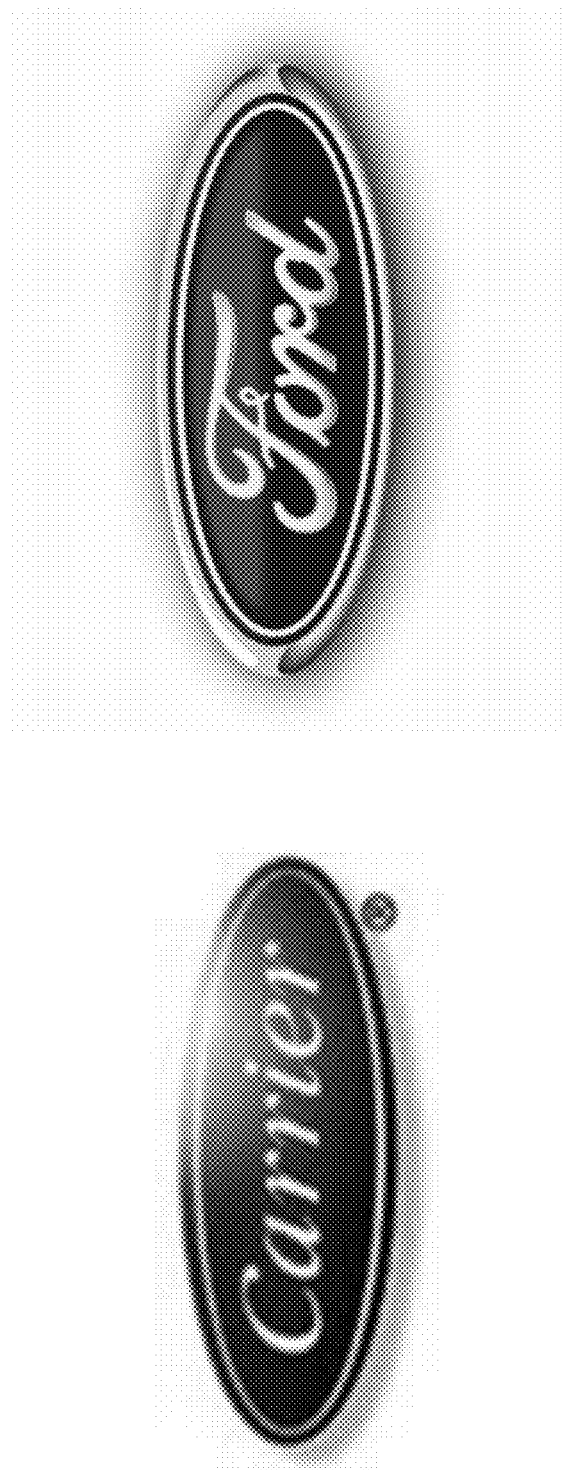
FIG. 10 is a graphic representation of example images processed by an embodiment of the present invention.

The feedback generator 416 is software and routines for providing feedback from the progressive feature server 206 to the client 208. In one embodiment, the feedback generator 416 is routines executable by the processor 402 to generate feedback signals as described below. The feedback generator 416 is coupled by the bus 450 to the processor 402, the memory 404, the communication unit 406, and the image recognizer 418. The feedback generator 416 cooperates with the image recognizer 418 to determine particular features that are likely to uniquely identify the input signal from the information stored in data storage 410. In one embodiment, the image recognizer 418 maintains a list of candidate matches and seeks the features that can most reduce the size of the candidate list. The feedback generator 416 cooperates with the image recognizer 418 to identify those features that most reduce the size of the candidate list and sends those features as hints to the client 208. For example, based on the image shape, the image recognizer 418 concludes that the submission is either a logo for Carrier or Ford as shown in FIG. 10. The image recognizer 418 then generates a hint for the client 208 for more features from the inner text to distinguish between these two logos. The feedback generator 416 receives the hint from the image recognizer 418. The feedback generator 416 uses the information from the image recognizer 418 to generate hints and sends those hints sent back to the client 208, in particular, the feedback receiver 326. The client 208 in turn uses these hints to adjust what features are included in the next package to increase the likelihood that the image can be more quickly recognized. In another embodiment, the feedback generator 416 also generates and sends a signal indicating that an image has been recognized and to stop sending additional groups of features.

The image recognizer 418 is software and routines for performing recognition based on input features. While the image recognizer 418 is described here primarily in the context of performing image recognition, those skilled the art will recognize that the image recognizer 418 in other embodiments could be an audio recognizer, or any other type of recognizer that compares features received against the database of information. In one embodiment, the image recognizer 418 is routines executable by the processor 402 to identify an image and retrieve information or metadata corresponding to that image as described below. The image recognizer 418 is coupled by the bus 450 to the processor 402, the memory 404, the communication unit 406, the progressive receiving module 414, the feedback generator 416 and the result delivery module 420.

The image recognizer 418 is coupled to the progressive receiving module 414 to receive groups or packages of features. In one embodiment, the image recognizer 418 creates a new thread to process each group of features. For example, when a first group of features is received that group of features is processed by a first thread, when a second group of features is received, it is combined with the first group of features and both groups of features are processed by a second thread, and so on. Thus, the image recognizer 418 creates any number of threads depending upon the number of groups of features that are received before recognition occurs. In other words, the image recognizer 418 starts processing the submitted feature vectors as they are received, and does not wait until all feature vectors are received. As soon as there are enough feature vectors for recognition, the image recognizer 418 notifies the client with the result via the result delivery module 420 and the client should stop submitting features. Those skilled in the art will understand that the image recognizer 418 in different embodiments may be based on KD-tree, geometrical hashing, RANSAC feature matching etc. The image recognizer 418 is also coupled to the feedback generator 416 to provide hints or information that can be converted to hints by the feedback generator 416. The image recognizer 418 is also coupled to the result delivery module 420. The image recognizer 418 provides the result delivery module 420 with information corresponding to the recognized image. In one embodiment, the result delivery module is also responsible for generating a termination signal to signal the client 208 not to transmit additional features. The image recognizer 418 in one embodiment is also coupled to data storage 410 to access a database of images, information and features. In another embodiment, the database is included as part of the image recognizer 418.

The result delivery module 420 is software and routines for sending the recognized image and other information to the client 208. In one embodiment, the result delivery module 420 is routines executable by the processor 402 to send the recognized image and other information to the client 208. The result delivery module 420 is coupled by the bus 450 to the processor 402, the memory 404, the communication unit 406 and image recognizer 418. In one embodiment, the result delivery module 420 also delivers a termination signal in addition to the recognized image. More specifically, the result delivery module 420 is adapted for communication with the feedback receiver 326.

Progressive Feature Selection and Progressive Submission

Figure 5:
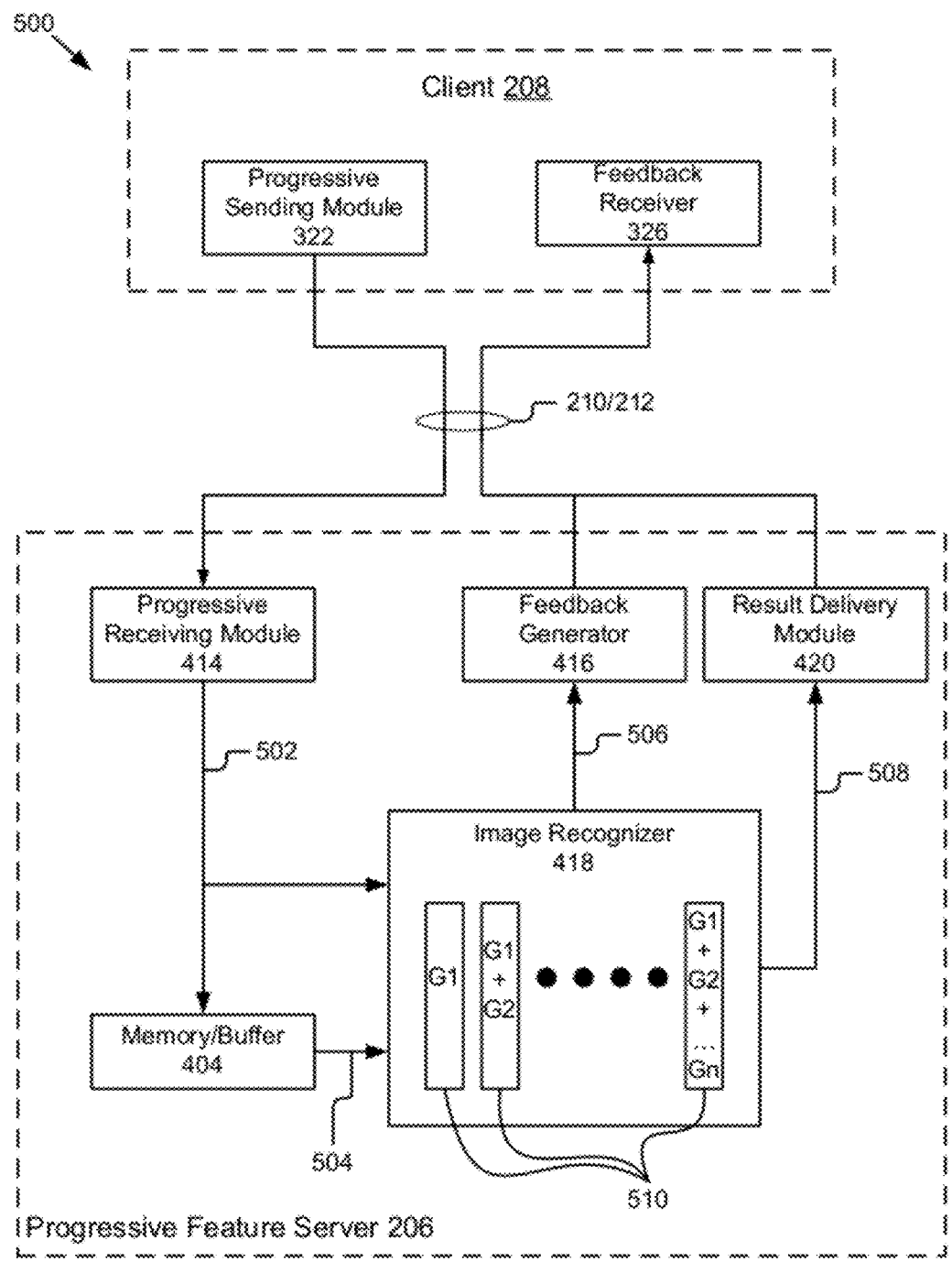
FIG. 5 is a schematic flow diagram illustrating information retrieval in accordance with one embodiment of the present invention.

FIG. 5 shows one embodiment of a method for information retrieval using progressive feature selection and progressive submission in accordance with the present invention. The process begins with the progressive sending module 322 sending groups of features as has been described above. Each group of features is sent one after the other in a serial manner. The groups of features are sent from the progressive sending module 322 of the client 208 to the progressive receiving module 414 of the progressive feature server 206. The progressive receiving module 414 and then sends 502 the group of features to the image recognizer 418. The progressive receiving module 414 also stores the group of features in the memory 404. The image recognizer 418 advantageously creates a separate thread 510 to process each group of features. As shown in FIG. 5, the image recognizer 418 and initiate a first thread with the first group (G1) of features once they are received. Once a second group (G2) of features has been received, the second group of features is combined with the first group of features from 504 the memory buffer 404, and a second thread is initiated to process the first group and the second group of features (G1+G2). The image recognizer 418 continues to create threads (G1+G2 . . . +Gn) as new groups of features are received from the progressive receiving module 414. At any time when their enough received features for successful recognition, the image recognizer 418 sends 508 the recognition results to the result delivery module 402, and the result delivery module 420 sends the results to the feedback receiver 326 via signal line 210/212. Similarly, the image recognizer 414 and the feedback generator 416 communicate and cooperate via signal line 506 to provide hints back to the feedback receiver 426. The present invention is particularly advantageous because it is feature independent. More specifically, no matter what features are being submitted to the progressive feature server 206, the search process will always be accelerated. FIG. 5 also illustrates how the claimed invention uses two active connections, one for uploading the image features and one for listening for results and hints. These are shown by a first connection between the progressive sending module 322 and the progressive receiving module 414, and a second connection between the feedback generator 416/result delivery module 420 and the feedback receiver 326 as shown in FIG. 5. For example, the first and second connections can be active TCP sockets. The progressive feature submission is faster because the progressive feature server 206 tries to recognize the partial uploaded feature set as they are received. As an example, the progressive feature server 206 runs three trials when 30%, 60% and 100% features are uploaded. If an image is recognized with only 30% of features uploaded this saves 70% of transmission time. The only added cost of this architecture is more CPU cycles on the server side. But in case an image is recognized at the first trial, it actually saves the server CPU cycles.

Figure 6:
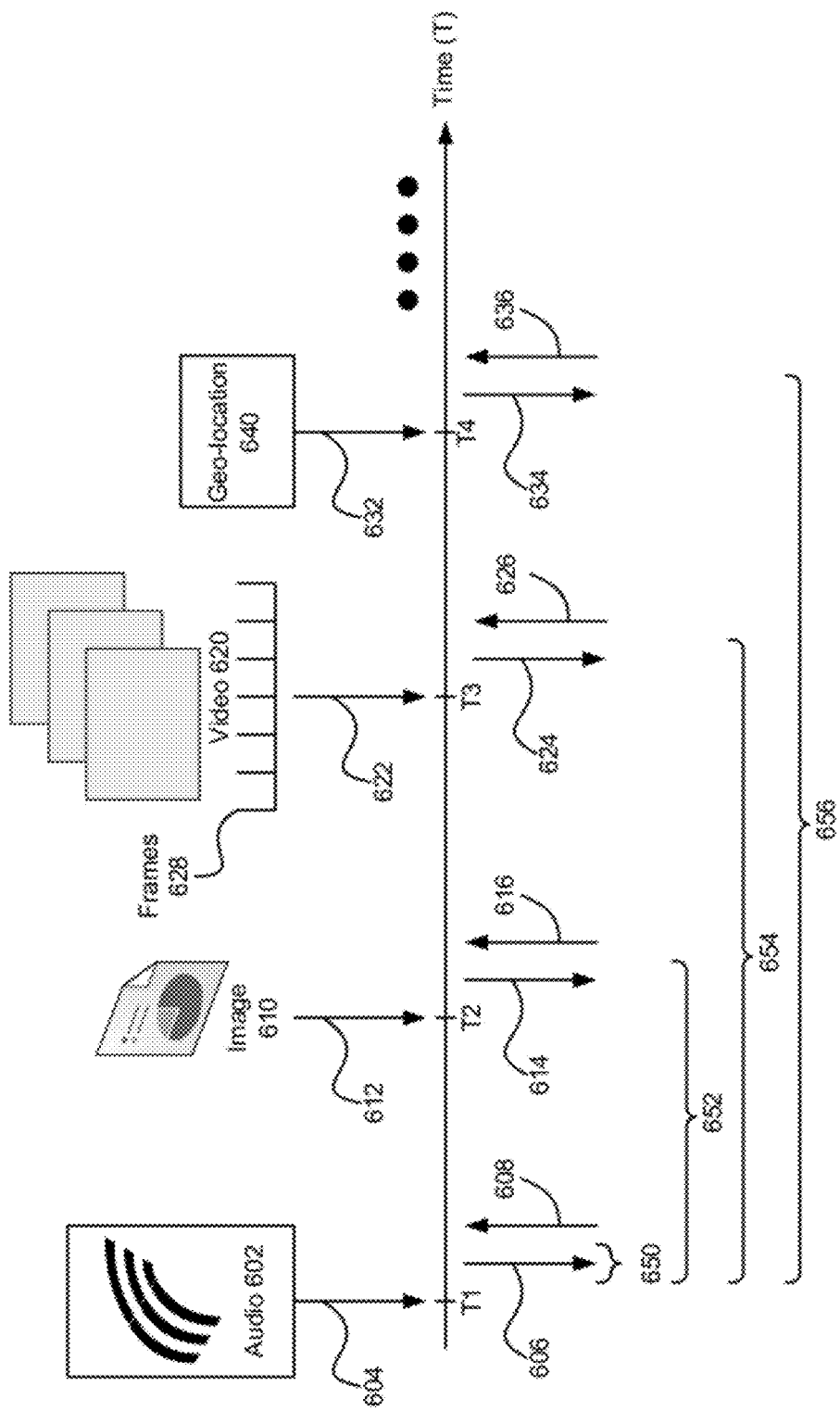
FIG. 6 is a schematic flow diagram illustrating capture of different capture event types and processing over a period of time in accordance with one embodiment of the present invention.

Referring now to FIG. 6, the present invention will be described in the context of performing information retrieval using several heterogeneous types of input signals and features from multiple points in time. For example, a smart phone may capture features including audio, image, video, and location information at different points in time. The unique features from across time may be used to identify an object, a scene or location of interest to the user. Thus, rather than relying on features from one particular image, the present invention may be applied to multiple different types of features that are gathered over a span of time.

As shown in FIG. 6, at a first time T1 an audio signal 602 is captured by the computing device 202 and the client 208 extracts features as represented by line 604. The client 208 next progressively submits the groups of features to the progressive feature server 206 as represented by line 606. To the extent possible, the progressive feature server 206 returns recognition results as represented by line 608. At this point in time, the progressive feature server 206 only has the features from the audio signal 602 captured at time T1 and that is the time span captured as represented by 650.

At a second later time T2, the computing device 202 captures an image 610 and the client 208 extracts features as represented by line 612. The client 208 progressively submits groups of features to the progressive feature server 206 as represented by line 614. Again, the progressive feature server 206 returns recognition results as represented by line 616, if possible. However, at this second later time T2, the progressive feature server 206 utilizes the groups of features received at both time T1 and time T2 as represented by bracket 652. The present invention is particularly advantageous in this regard because the progressive feature server 206 is able to perform recognition using features from multiple points in time along the timeline. Furthermore, the present invention is able to perform recognition on features of different types, in this case audio features and image features.

At a third later time T3, the computing device 202 captures video 620. The sampling module 324 processes the video 620 to produce a plurality of frames 628. The client 208 then progressively extracts features from the plurality of frames 628 as represented by line 622. As the features are extracted, they are grouped and progressively submitted to the progressive feature server 206 as represented by line 624. If possible, the progressive feature server 206 returns recognition results as represented by line 626. This illustrates how preprocessing or sampling of the input signal may occur prior to feature extraction. In one embodiment, at time T3 the progressive feature server 206 uses the features provided not only at time T3, but also the features submitted by the client 208 at times T1 and T2 as represented by bracket 654.

Finally at the fourth time T4, the computing device 202 captures location information 640. The location information is used to calculate the position of the computing device 202 as represented by line 632. The position of the computing device 202 is provided to the progressive feature server 206 as represented by line 634. This information is used along with the prior groups of features to perform or filter the recognition results as represented by line 636. Thus, after time T4 the progressive feature server 204 uses audio features, image features, video features and the position of the computing device 202 to perform recognition. It should be noted that recognition, therefore, occurs over a time span from T1 to T4 as represented by bracket 656. Furthermore, the recognition at time T4 illustrates how multiple different types of feature vectors are used in performing recognition. It should be understood that in one embodiment, each of the groups of feature vectors submitted a different times are each provided with timestamps, thereby allowing the progressive feature server 206 to determine appropriate span of time in which groups of feature vectors to include or eliminate from the recognition process.

Methods

Figure 7:
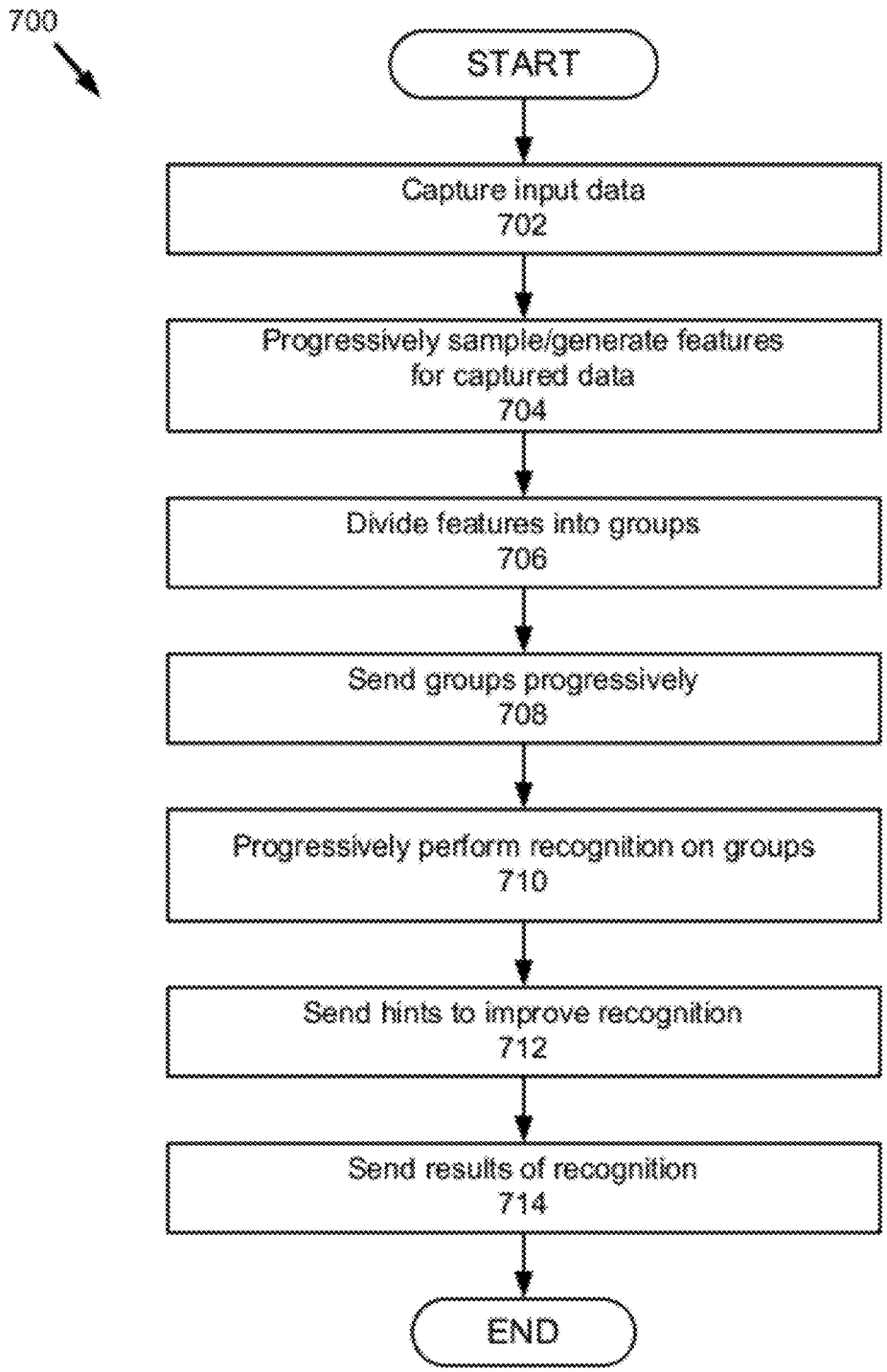
FIG. 7 is a flow chart illustrating an embodiment of a method for information retrieval in accordance with the present invention.
Figure 8:
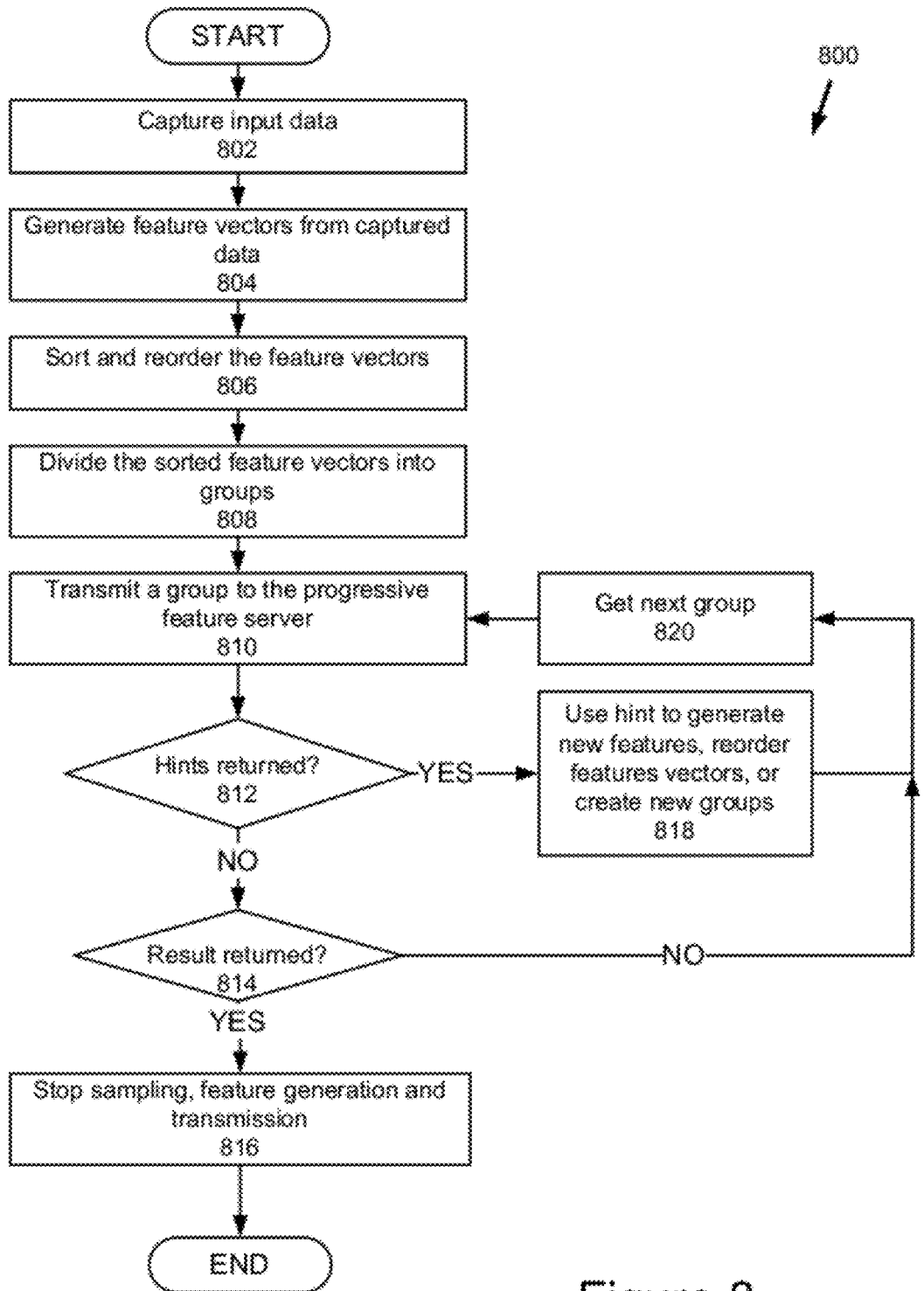
FIG. 8 is a flow chart illustrating an embodiment of an information retrieval method performed by the computing device in accordance with the present invention.
Figure 9:
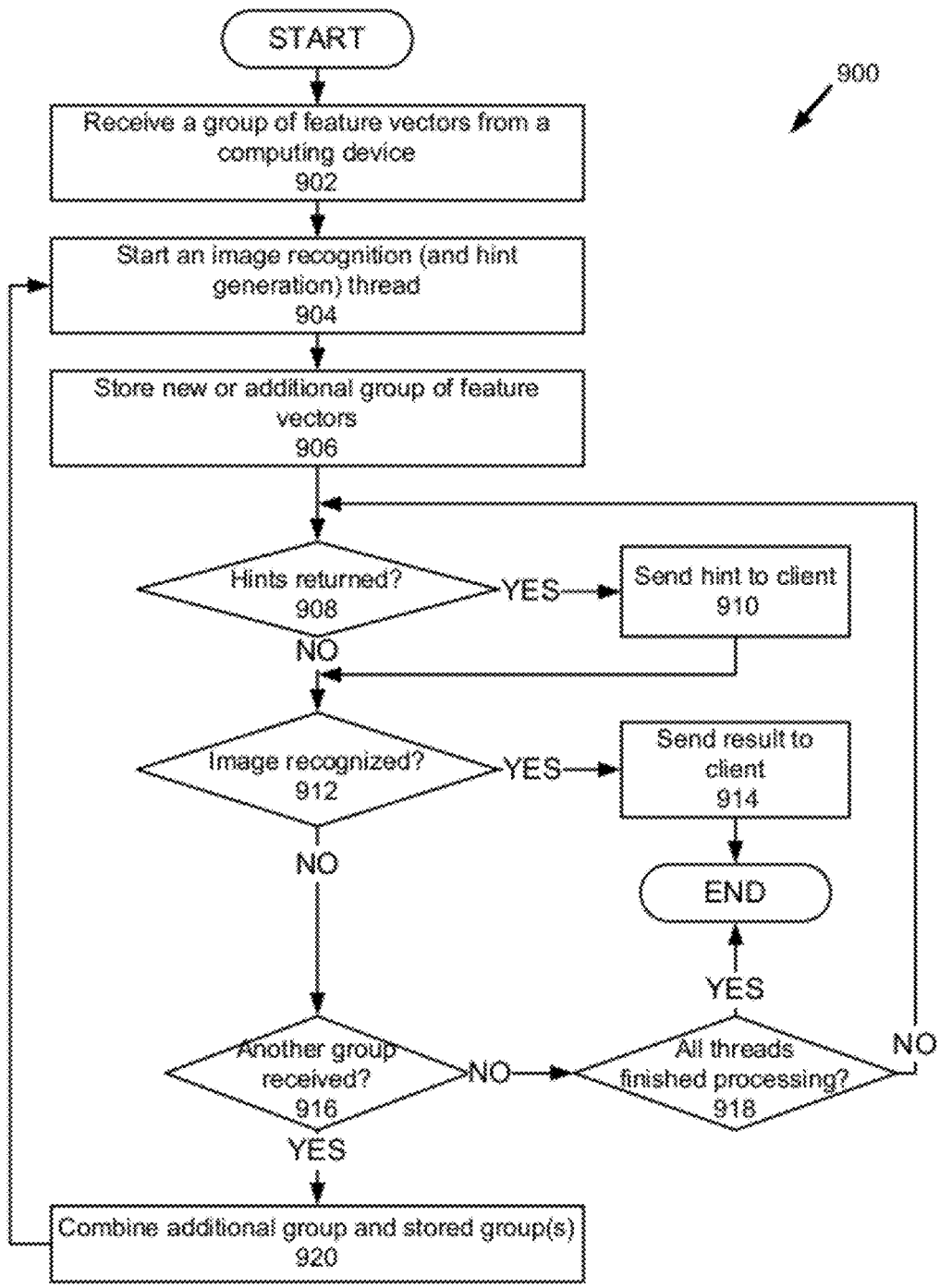
FIG. 9 is a flow chart illustrating an embodiment of an information retrieval method performed by the progressive feature server in accordance with the present invention.

Referring now to FIGS. 7-9, the methods of the present invention are described in more detail.

Referring now to FIG. 7, a method 700 for information retrieval in accordance with the present invention will be described. FIG. 7 illustrates the general method 700 for performing information retrieval in accordance with the present invention where features are progressively selected and progressively submitted for recognition. The method 700 begins by capturing 702 input data. Next, the method progressively samples and/or generates 704 features from the captured data. In one embodiment, the method 700 generates the features for the entire feature set of captured data before transmission. In another embodiment, the method begins to divide 706 and send features 708 to the progressive feature server 206 as soon as a group of features is available. The method continues by dividing 706 the features into groups or packages. In one embodiment, the features are sorted by scale and then divided into groups. For example, the features are sorted by feature size, feature density, etc. Then the client 208 sends 708 groups of features progressively. In other words, the client 208 sends groups of features to the progressive feature server one group at a time. The groups of features are received by the progressive feature server 206 and the progressive feature server performs 710 recognition. In one embodiment, at certain percentages of the full feature set, the image recognizer 418 creates a thread to perform matching on the percentage of received features. At different stages, the image recognizer 418 provides each thread a different candidate list of images to search for the matching image. The candidate list is generated based on the received features and results of past stages. Optionally, the progressive feature server 206 sends 712 hints back to the client 208 that are used to improve recognition. For example, the progressive feature server 206 can send hints that ask for features that reduce the size of candidate list by the largest percentage. Finally, the method is complete by either sending 714 the recognition results or an indication that there is no match.

Referring now to FIG. 8, one embodiment of a method 800 for information retrieval by a client 208 of a computing device 202 in accordance with the present invention will be described. FIG. 8 illustrates the method executed by the client 208 to perform feature extraction progressively and to submit groups or packages of features progressively. The method begins by capturing 802 input data. As has been noted above, the present invention will be described primarily in the context of extracting feature vectors from images; however, the capturing of input data could also be video data, audio data, geographic data or any other type of information that might be utilized to perform or enhance a search. Next, the method generates 804 feature vectors from the captured data. For example, the feature extraction module 320 of the client 208 extracts feature vectors using any one of the image recognition types described above. Next, the progressive sending module 322 sorts 806 the feature vectors by scale. As noted above, the feature vectors can be sorted by feature size, feature density, received feature order, etc. Then the progressive sending module 322 divides the stored feature vectors into groups or packages. In one embodiment, the groups are predefined percentages (e.g., 20%, 40%, 60%, 80%, and 100%) of the full feature set for the image. The method continues by transmitting 810 a group of feature vectors to the progressive feature server 206.

Next the client 208 determines 812 whether any hints have been returned from the feedback generator 416 of the progressive feature server 206. If so, the method continues in step 818 and uses the hints to generate/extract new features, reorder feature vectors or create new groups. After the hints have been used to create new groups or packages, the method continues by retrieving 820 a next group for transmission to the progressive feature server 206. Using this next group, the method continues in step 810 and transmits that group to the progressive feature server 206. This is particularly advantageous because the present invention is able to use feedback from the progressive feature server 206 to deliver groups of features that are most likely to produce a matching result.

If the client 208 determined that no hints have been returned from the progressive feature server 206, the method continues to determine whether the progressive feature server 206 has returned any matching results. If so, the method presents 816 the returned results to the user, and stops 806 sampling, feature generation and transmission, after which the method is complete. This is particularly advantageous because if the progressive feature server 206 is able to recognize the image using only the first group of feature vectors, the client 208 will discontinue processing and thereby save computational resources well as network bandwidth.

Referring now to FIG. 9, one embodiment of a method 900 for information retrieval by the progressive feature server 206 in accordance with the present invention will be described. The progressive feature server 206 is particularly advantageous because it initiates a series of image recognition threads progressively depending on how much information about a particular image has been received. The method 900 begins by receiving 902 a group of feature vectors from the computing device 202. In particular, the progressive receiving module 414 receives 902 the group of feature vectors from the progressive sending module 322 of the client 208. Next, the progressive feature server 206 starts 904 an image recognition thread using the received group of feature vectors. In particular, the image recognizer 418 starts a thread from the received group of feature vectors. In another embodiment, the progressive feature server 206 also is activated to generate hints. The group of feature vectors is also stored 906 in a buffer or memory 404. The group of feature vectors is stored in the buffer 404 so that it can be used or combined later with other groups of feature vectors factors that are received.

Next the method determines 908 whether the image recognizer 418 has produced any hints in attempting to recognize an image from the group of feature vectors. If so, the method sends 910 the hints to the client 208. In one embodiment, the hints are generated by the image recognizer 418 and the hint is sent to the feedback generator 416. The feedback generator 416 in turn sends the hint to the feedback receiver 326 of the client 208. After either step 908 or step 910, the method determines 912 whether the image has been recognized. If so, the method continues in step 914 and sends the recognition results to the client 208. If an image is not recognized, the method continues to determine 916 whether another group of feature vectors has been received from the client 208. If so, the method combines 920 the newly received group of feature vectors with the one or more groups of feature vectors stored in memory 404 and for the same image. After the groups of feature vectors have been combined, they are provided to the image recognizer 418 and the method returns to step 904 to create another thread that processes the combined group of feature vectors. If the method determined 916 that another group of feature vectors was not received, the method proceeds to step 918 to determine whether all threads of have finished processing. If all threads have completed processing there is no match and the method is complete and ends. However, if not all threads have completed processing the method loops to step 908 to continue to determine whether any hints or recognized images have been produced by the remaining processing threads.

Those skilled in the art will recognize that the methods described above with reference to FIGS. 7-9 can be modified to process multiple points in time as well as different feature sets, and that processing of images is used only by way of example.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. An apparatus for generating feature vectors and sending them to a server for information retrieval, the apparatus comprising:
   one or more processors;
   a feature extraction module stored on a memory and executable by the one or more processors, the feature extraction module having an input and an output for extracting features from an image, the input of the feature extraction module coupled to receive the image;
   a grouping module stored on the memory and executable by the one or more processors, the grouping module having an input and an output for dividing the extracted features into groups of feature vectors, each group of feature vectors including a predefined percentage of a full feature set extracted from the image, the grouping module ordering and grouping the feature vectors in response to receiving a hint from a feedback receiver; the input of the grouping module coupled to the output of the feature extraction module;
   a sending module stored on the memory and executable by the one or more processors, the sending module having an input and an output for transmitting the groups of feature vectors to the server, wherein each group of feature vectors including the predefined percentage of the full feature set of the image is sent progressively and serially until the server identifies a matching result from a database of information, the input of the sending module coupled to the output of the grouping module, and the output of the sending module coupled to a network to access the server; and the feedback receiver having an input and an output, the input of the feedback receiver coupled to receive a hint from the server that identifies features that most reduce a size of a candidate list of matching results from the server, and the output of the feedback receiver coupled to the input of the grouping module.

2. The apparatus of claim 1 comprising a sampling module having an input and an output for selecting portions of the image for processing, the input of the sampling module coupled to receive the image, the output of the sampling module coupled to the input of the feature extraction module.

3. The apparatus of claim 1 wherein the feature extraction module extracts one from the group of scale invariant features, invisible junction features, compressed histogram of gradients features, speeded up robust features, fast key point recognition features, and fully affine scale invariant features.

4. The apparatus of claim 1 wherein the feature extraction module extracts the features from a plurality of temporal points in time.

5. The apparatus of claim 1 wherein the feature extraction module extracts the features from a plurality of portions of the image.

6. The apparatus of claim 1 wherein the grouping module assigns the feature vectors into groups according to one from the criteria of: a random selection, a reading order, a sparse selection, a feature scale, a feature space density, a geometric location and time of capture.

7. The apparatus of claim 1 wherein the sending module stops sending the groups of feature vectors in response to the feedback receiver receiving the hint.

8. The apparatus of claim 1 wherein the feedback receiver receives the hint in response to the server receiving the groups of feature vectors and generating the a candidate list of matching results.

9. An apparatus for processing feature vectors and sending results to a client for information retrieval, the apparatus comprising:
one or more processors;
a receiving module stored on a memory and executable by the one or more processors, the receiving module having an input and an output for receiving groups of feature vectors, wherein each group of feature vectors including a predefined percentage of a full feature set associated with an image is received progressively and serially, the input of the receiving module coupled to the client to receive the groups of feature vectors;
an image recognizer stored on the memory and executable by the one or more processors for identifying a matching result from a database of information based on the groups of feature vectors, wherein each group of feature vectors including a predefined percentage of the full feature set of the image is used to identify the matching result progressively, the image recognizer coupled to the output of the receiving module to receive the groups of feature vectors;
a result delivery module stored on the memory and executable by the one or more processors, the result delivery module having an input and an output for sending a matching result to the client so that the client stops sending the groups of feature vectors, the input of the result delivery module coupled to receive the matching result from the image recognizer and the output of the result delivery module coupled to a network to access the client; and
a feedback generator for producing a hint that identifies features that most reduce a size of a candidate list of matching results, the feedback generator coupled to the image recognizer to generate the hint, and coupled to send the hint to the client.

10. The apparatus of claim 9 wherein the image recognizer begins processing for identifying the matching result before receiving a full feature vector set.

11. The apparatus of claim 9 wherein the image recognizer sends the matching result when sufficient feature vectors are received for successful matching.

12. The apparatus of claim 9 wherein the image recognizer processes the groups of feature vectors from a plurality of temporal points in time.

13. The apparatus of claim 9 wherein the image recognizer processes the groups of feature vectors from a plurality of portions of an image.

14. The apparatus of claim 9 wherein the image recognizer processes each group of feature vectors with a separate thread.

15. The apparatus of claim 14 wherein the image recognizer terminates processing by separate threads when one thread has generated the matching result.

16. The apparatus of claim 9 wherein the feedback generator generates the hint in response to the server receiving the groups of feature vectors.

17. A computer-implemented method for performing information retrieval, the method comprising:
receiving, with one or more processors, an image at a client;
extracting, with the one or more processors, features from the image at the client;
dividing, with the one or more processors, the extracted features into groups of feature vectors at the client, each group of feature vectors including a predefined percentage of a full feature set extracted from the image;
transmitting, with the one or more processors, the group of feature vectors wherein each group of feature vectors including a predefined percentage of the full feature set of the image is sent progressively and serially from the client to the server;
receiving a hint that identifies features that most reduce a size of a candidate list of matching results from the server to the client to modify the features sent by the client; and
upon receiving a matching result from the server, stopping progressively and serially transmitting the groups of feature vectors at the client.

18. The method of claim 17, comprising sorting the features by a random selection, a reading order, a sparse selection, a feature scale, a feature space density, a geometric location or time of capture.

19. The method of claim 17, wherein upon receiving the hint, stopping progressively and serially transmitting the groups of feature vectors at the client.

20. The method of claim 17, wherein the server identifies the matching result by processing with a first thread a first group of features received from the client, and processing with a second thread the first group of features and a second group of features received from the client.

* * * * *